United States Patent
Boyd et al.

(10) Patent No.: US 10,721,375 B1
(45) Date of Patent: Jul. 21, 2020

(54) VEHICLE CAMERA CONTAMINATION DETECTION

(71) Applicant: Amazon Technologies, Inc., Seattle, WA (US)

(72) Inventors: Scott Patrick Boyd, Seattle, WA (US); Chengwu Cui, Redmond, WA (US); Sarah Graber, Seattle, WA (US); Joshua John Watson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 466 days.

(21) Appl. No.: 15/248,757

(22) Filed: Aug. 26, 2016

(51) Int. Cl.
 *H04N 7/18* (2006.01)
 *H04N 5/217* (2011.01)
 *B60R 1/00* (2006.01)

(52) U.S. Cl.
 CPC ............. *H04N 5/2171* (2013.01); *B60R 1/00* (2013.01); *H04N 7/18* (2013.01)

(58) Field of Classification Search
 CPC ........... H04N 5/2171; H04N 7/18; B60R 1/00
 See application file for complete search history.

(56) References Cited

U.S. PATENT DOCUMENTS

| | | | |
|---|---|---|---|
| 2015/0213318 A1* | 7/2015 | Einecke | G06K 9/00791 382/103 |
| 2016/0355257 A1* | 12/2016 | Chappell | B64C 39/024 |
| 2018/0025649 A1* | 1/2018 | Contreras | G05D 1/0033 701/3 |
| 2018/0046187 A1* | 2/2018 | Martirosyan | G05D 1/0094 |

* cited by examiner

*Primary Examiner* — Dave Czekaj
*Assistant Examiner* — Berteau Joisil
(74) *Attorney, Agent, or Firm* — Kilpatrick Townsend & Stockton LLP

(57) ABSTRACT

Systems and methods for detecting contamination on a sensor cover. In an example, an image sensor of a vehicle may be used to capture an image of an environment of the vehicle. A sensor cover may be positioned outwardly from the image sensor and may form a covered volume around at least a sensing surface of the image sensor. A light source may be positioned in the covered volume. A management module may be coupled with the image sensor. The management module may be configured to receive test image data of the environment generated by the image sensor while the light source is on, compare the test image data to baseline image data generated while the light source is off, and detect whether contamination exists on a surface of the sensor cover based on the comparison.

20 Claims, 8 Drawing Sheets

VEHICLE CAMERA CONTAMINATION DETECTION

BACKGROUND

Sensors are commonly used in different systems and across multiple technologies. An image sensor is one example. This sensor type has been adopted in vehicles to support different missions. For instance, certain unmanned aerial vehicles (UAVs) integrate one or more image sensors to detect and avoid obstacles.

A common use of an image sensor of a vehicle is for supporting a mission of the vehicle by capturing images of an external environment. This use exposes the image sensor to elements of the environment. To extend the lifetime and improve the sensitivity of the image sensor, the image sensor is generally protected with a cover that is transparent relative to the operational light wavelength. However, contamination from the external environment may nonetheless occur. For example, debris, dust, dirt, mud, water, ice, and/or contaminations may accumulate on the cover. Such contaminations may impact the transparency of the cover and, thus, may obstruct, partially or fully, the external environment relative to the image sensor. Therefore, the quality of the images may degrade, which may in turn jeopardize the vehicle's mission.

BRIEF DESCRIPTION OF THE DRAWINGS

Various embodiments in accordance with the present disclosure will be described with reference to the drawings, in which.

DETAILED DESCRIPTION

Figure 1:
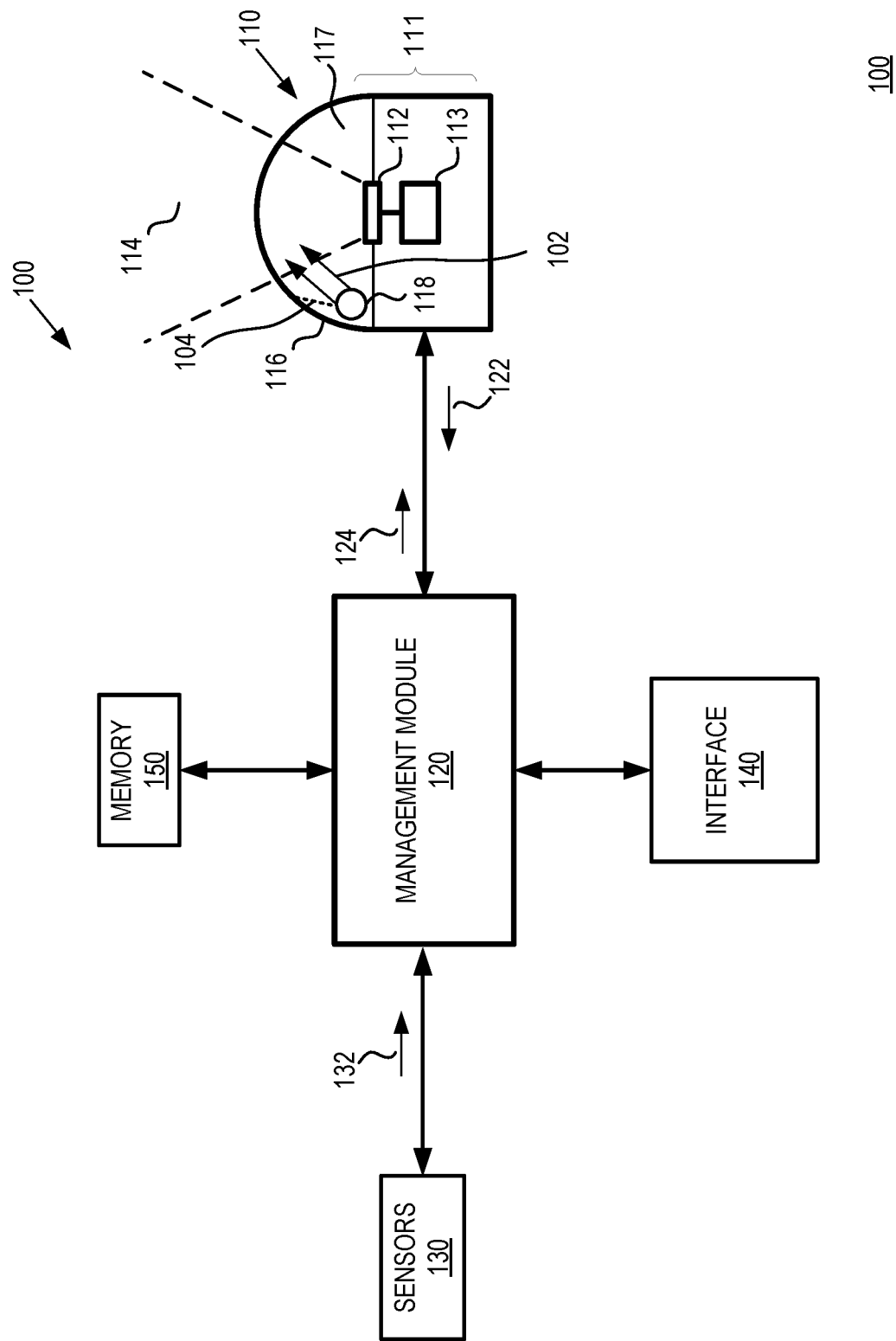
FIG. 1 illustrates a system that may be included in a vehicle, such as UAV, in accordance with an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods of detecting contamination on a sensor cover and initiating a corrective action are described herein. In an example, a vehicle may include an image sensor and a cover that may protect the image sensor from elements of an external environment. The image sensor and the cover (also referred to herein as a "sensor cover") may be components of a camera system that interfaces with other systems of the vehicle, such as with a propulsion system and/or a navigation system. Contamination may occur on the sensor cover, thereby degrading the quality of captured images. To detect the contamination, the camera system may also include a light source coupled with a management module. The management module may be a component of the camera system or any of the other vehicle systems. The light source may be positioned between the image sensor and the sensor cover at a particular location that does not impact the light exposure of the image sensor to the external environment or the quality of the captured images. For instance, the light source may be out of the field of view of the image sensor and may be positioned at a relative angle such that its reflection from the sensor cover may also be out of the field of view of the image sensor. Additionally, the light source may be controlled by the management module. For instance, the management module may turn on and off the light source based on an activation event. In operation, a baseline image of the external environment may be captured by the image sensor while the light source is off. The management module may then turn the light source on. While on, the image sensor may capture a test image of the external environment. The management module may compare image data from the baseline and test images. For instance, image histograms and/or image sharpness may be analyzed. Differences between the two images may indicate the presence of contamination on the sensor cover.

If contamination is detected, the management module may trigger a corrective action. The corrective action may include a notification for presentation to an operator of the vehicle, such as for presentation via a user interface of the navigation system. The corrective action may alternatively or additionally include a notification to other systems of the vehicles, such as to the propulsion system. In this case, the notification may include information about how reliable the sensed image data is given the contamination. Based on the reliability, the other vehicle systems may continue to rely on the sensed image data and/or activate other devices. For example, if the sensed image data is used to detect obstacles, other sensors may be turned on (e.g., location sensors, radars, etc.) or data sensed by these sensors may be relied on more. Further, a wiper, air blower, and/or solution sprayer may be turned on to remove the contamination.

To illustrate, consider an example of a UAV that integrates a camera system for detecting obstacles. The propulsion system of the UAV may subscribe to an output of the camera system such that the UAV may be maneuvered to avoid any detected obstacle. In this illustrative example, a management module may instruct the propulsion system to halt movement of the UAV (e.g., to maintain a flight position). Once halted, the management module may activate an image sensor of the camera system to capture a baseline image, turn on a light source of the camera system, and activate the image sensor to capture a test image. Image data from the two images may be compared to detect differences and, accordingly, contamination. Once detected, the management module may notify the propulsion system of the contamination, provide instructions for resuming the flight, may activate a location sensor and a radar of the UAV, and may turn off the image sensor and the light source. Sensed data from these two components may be used in lieu of the image data to detect obstacles and direct the propulsion of the UAV for obstacle avoidance.

In the interest of clarity of explanation, embodiments of the present disclosure are described in connection with a UAV and the use of a camera system to detect and avoid obstacles. However, the embodiments are not limited as such. Instead, the embodiments similarly apply to any other types of vehicle, whether unmanned or manned, autonomous, semi-autonomous or manually-operated, and/or ground, air or water-based vehicles and, even, stationary vehicles. Likewise, the embodiments similarly apply to other vehicle critical and non-critical missions that may rely on image data. Generally, the embodied techniques rely on a light source properly positioned between an image sensor and a sensor cover to enable the image sensor to generate baseline image data and test image data and to enable an analysis of the data to detect contamination and trigger a corrective action.

FIG. 1 illustrates a system 100 that may be included in a vehicle, such as UAV. The system 100 may include a camera system 110, a management module 120, an array of sensors 130, an interface 140, and a memory 150. Some or all of these components may be integrated. For example, the management module 120 may be integrated with the camera system 110. Likewise, some or all of these components may be integrated with other vehicle components. For example, the management module 120 may be integrated with a central control system of the vehicle. Generally, the management module 120 may control operations of the camera system 100 to receive baseline and test image data. The data may be analyzed to detect contamination. Once detected, the management system may activate some or all of the sensors 130 and/or may provide notifications about the contamination to other vehicle systems via the interface 140. Based on the notification, the other vehicle system may then rely on sensed data from the sensors 130 instead or in addition to image data 122 sensed from the camera system 110.

In an example, the camera system 110 may provide the image data 122 to the management module 120. The image data 122 may represent images of an environment external to the vehicle. To do so, the camera system 110 may include an image sensor 111, a sensor cover 116, and a light source 118, among other components.

The image sensor 111 may generate the image data 122. For example, the image sensor 111 may be a suitable analog or digital image sensor operational in a range of light wavelength, such as in visible and/or near infrared spectrums. Camera tubes, vacuum tubes, flat panel detectors, semiconductor charge-coupled devices (CCD), active pixel sensors in complementary metal-oxide-semiconductor (CMOS), N-type metal-oxide-semiconductor (NMOS, Live MOS) are example technologies suitable for the image sensor 111.

More specifically, the image sensor 111 may include a sensing surface 112 and circuitry 113. The sensing surface 112 may sense information about the external environment based on exposure to ambient light of the external environment. The exposure may occur within a particular field of view 114 of the image sensor 111. The sensing may convert the variable attenuation of light waves into signals that convey the information. The circuitry 113 may include analog and/or digital circuitry for processing the signals to generate the image data 122.

The sensor cover 116 may protect, at least, the sensing surface 112 from direct exposure to elements of the external environment while also allowing ambient light to reach the sensing surface 112. For example, the sensor cover 116 may be made of a material that may surround, at least, the sensing surface 112 and, thus, form a volume 117 around the sensing surface. The material may be rigid while also being light transparent. Light transparency depends on the wavelength spectrum that the image sensor 111 may sense. Glass, plastic, and other materials may be suitable for the sensor cover 116. In an example, the sensor cover 116 may be a lens of the image sensor or may be an additional protective cover.

The light source 118 may represent a source configured to emit light 102 within a particular wavelength spectrum. This spectrum may match the operational spectrum of the image sensor 111. Generally, turning on and off the light source 118 may be controlled via the circuitry 113 of the image sensor 111 or through other suitable circuitry. The control may be remote from the management module 120. The light source 118 may emit the light 102 outwards toward the sensor cover 116. The emitted array of the light 102 may be wide enough to cover a portion or the entire sensor cover 116 such that any scattering or reflection back of the light 102 from a contamination that is on the sensor cover 116 and is within the field of view 114 may be sensed by the image sensor 111.

In an example, the light source 118 may be positioned at a particular position within the volume 117 formed by the sensor cover 116. In position, the light source 118 may not impact the image data 122 captured by the image sensor 111. For instance, the light source 118 may be positioned to be out of the field of view 114. In addition, the light source 118 may be at an angle relative to the sensing surface 112 such that any reflection 104 of the light source 118 from the sensor cover 106 may also be out of the field of view 114.

The management module 120 may receive and analyze the image data 122 to detect whether a contamination exists on the sensor cover 116 or not. In an example, the management module 120 remotely controls some or all operations of the camera system 110. The control may be effectuated via control commands 124. For instance, the management module 120 may turn on and off the camera system 110, activate and/or deactivate the image sensor 111 (e.g., to sense and generate the image data 122 and/or to stop the sensing), and/or turn on and off the light source 118. Various parameters may be used for the control and are further described in connection with the next figures.

In an example, the management module 120 may receive baseline image data from the camera system 110. The baseline image data may be generated by the image sensor 111 while the light source 118 may be in an off state. The baseline image data may represent an image of the external environment captured by the image sensor 111 through the sensor cover 116, while the light source 118 is off. The management module 120 may also receive test image data from the camera system 110. The test image data may be generated by the image sensor 111 while the light source 118 may be in an on state and emitting the light 102. The test image data may also represent an image of the same external environment captured by the image sensor 111 through the sensor cover 116, while the light source 118 is on. The management module 120 may compare the baseline image data and the test image data to identify differences. Based on the differences, the contamination may be detected. In addition, the management module 120 may estimate a contamination metric, such as a rate of the contamination, based on the differences. The metric may indicate how many pixels of an image may have been obstructed by the contamination and, therefore, do not properly represent the external environment. Depending on the contamination detection and/or the estimated contamination metric, the management module 120 may trigger one or more corrective actions.

Generally, a corrective action may relate to the usability of the image data 122, usability of other sensed data 132 (e.g., sensed by the sensors 130), usage of the camera system 110, and/or usage of other vehicle systems in connection with a mission of the vehicle. For example, the management module 120 may turn on or activate the sensors 130 to generate the sensed data 132. In addition, the management module 120 may communicate with the other vehicle systems via the interface 140. Through the interface 140, the management module 120 may notify the vehicle systems of the contamination. Some of the notifications may provide controls over and/or instructions for the operations of the vehicle systems given the image data 122 and the sensed data 132. In response, some of the vehicle systems may stop using the image data 122 and/or may rely more heavily on the sensed data 132. For instance, the management module 120 may send propulsion commands to a propulsion driver driving electric motors of the vehicle. These commands may rely on the sensed data 132 rather than the image data 122. In another illustration, the management module 120 may control a wiper system, an air blower, or a solution sprayer of the vehicle to clear the contamination off the sensor cover 116. In yet another illustration, the management module 120 may instruct a user interface system to present a notification about the contamination to an operator of the vehicle.

In an example, the management module 120 may include a processing logic such as a processor, microprocessor, multiple processing cores, FPGA, or otherwise. The management module 120 may be communicatively coupled to the memory 150. Computer-executable instructions, software or firmware implementations of the management module 120 may include computer-executable or machine-executable instructions written in any suitable programming language to perform the various operations described herein. The memory 150 may store program instructions that are loadable and executable on the management module 120. The memory 150 may be volatile (such as random access memory (RAM)) and/or non-volatile (such as read-only memory (ROM), flash memory, or other memory).

Although FIG. 1 illustrates a single camera system that includes a single image sensor, sensor cover, and light source, a different number of such components may be implemented. For example, a vehicle may integrate multiple camera systems. Similarly, a camera system may include, within a same sensor cover, multiple light sources and/or multiple image sensors.

Figure 2:
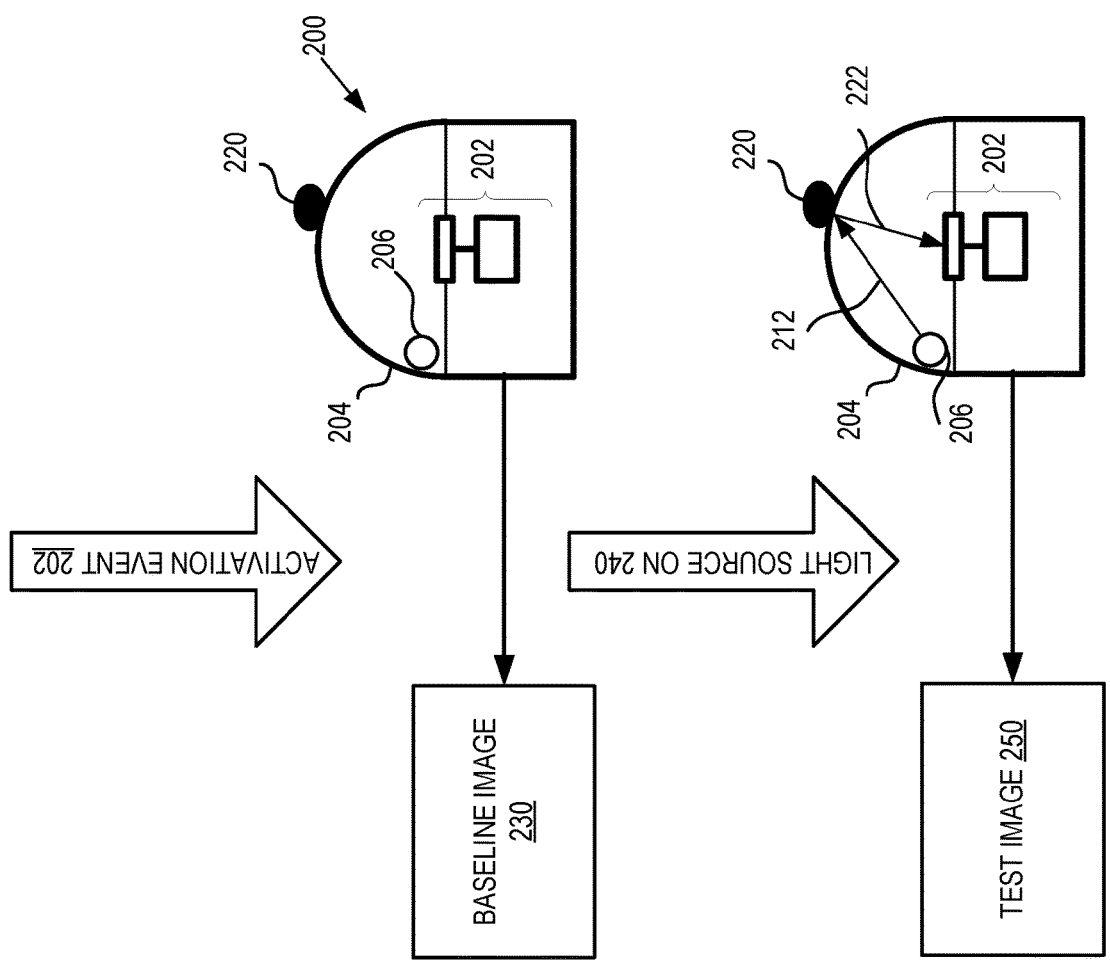
FIG. 2 illustrates examples of image data generated to detect the presence of contamination on a sensor cover, in accordance with an embodiment of the present disclosure.

FIG. 2 illustrates examples of image data generated to detect the presence of contamination on a sensor cover. As illustrated, a camera system 200 may be used and may be a system of a vehicle. The camera system 200 may be similar to the camera system 110 of FIG. 1 and may include an image sensor 202, a sensor cover 204, and a light source 206. Contamination 220 may occur on a surface of the sensor cover 204. Based on an activation event 202, the image sensor 202 may generate a baseline image 230, while the light sensor 206 is off. The light sensor 206 may then be turned on. In the on state 240, the light sensor may emit light 212. The light 212 may be scattered back from the contamination 220, illustrated in FIG. 2 as scattered light 222. In parallel and while in the on state 240, the image sensor 202 may generate a test image 250. Because of the scattered light 222, the test image 250 may be different from the baseline image 230. In particular, the test image 250 may show a relatively brighter reflection of the contamination 220. Accordingly, the presence of the contamination 220 may be detected when a comparison of the image data of the baseline image 230 and the test image 250 indicates that the image sensor 202 sensed the scattered light 222.

Depending on the type of contamination 220, the surface may be the internal and/or the external surface of the sensor cover 204. For example, dirt may accumulate on the external surface, whereas moisture may penetrate the sensor cover 204 and collect on the internal surface. Although FIG. 2 illustrates a single concentrated contamination 220, multiple contaminations may exist and/or the contamination 220 may be distributed across the surface of the sensor cover 204.

Various types of the activation event 202 may be possible and may be used to trigger the contamination check. For example, a user-initiated command may be received by the camera system 200. In another example, the camera system 200 may automatically initiate the check at a predefined check cycle. In yet another example, the check may automatically occur at or be scheduled for a particular time of day (e.g., at night time to improve the quality of the check) or when the vehicle is at particular location with a known light exposure level (e.g., a low light environment, such as in a parking facility or hangar). In a further example, the activation event 202 may be mission dependent. For instance, the activation event 202 may be a start or a potential start of a mission or a maneuver of the mission that relies on image data. In this way, the sensor cover 204 may be checked just in time, thereby ensuring that any contamination accumulated since the last check may be detected. To illustrate, the mission may include detecting and avoiding obstacles. Hence, as the vehicle approaches a potential obstacle (e.g., three feet or some other threshold distance away from the obstacle depending on the mission, the vehicle, and/or obstacle), the check may be performed.

Generally, the activation event 202 may be used to activate the image sensor 202 and to turn on the light source 206. Activating the image sensor 202 may depend on an operational state of the image sensor 202. For example, if turned off, the image sensor 202 may be turned on. If on but in an idle state (e.g., not generating image data), the image sensor 202 may move to an active state in which image data is generated. If in an active state, the image data may be marked as being baseline image data (e.g., generated before the light source 206 was turned on) or as being test image data (e.g., generated while the light source 206 was turned on).

Figure 3:
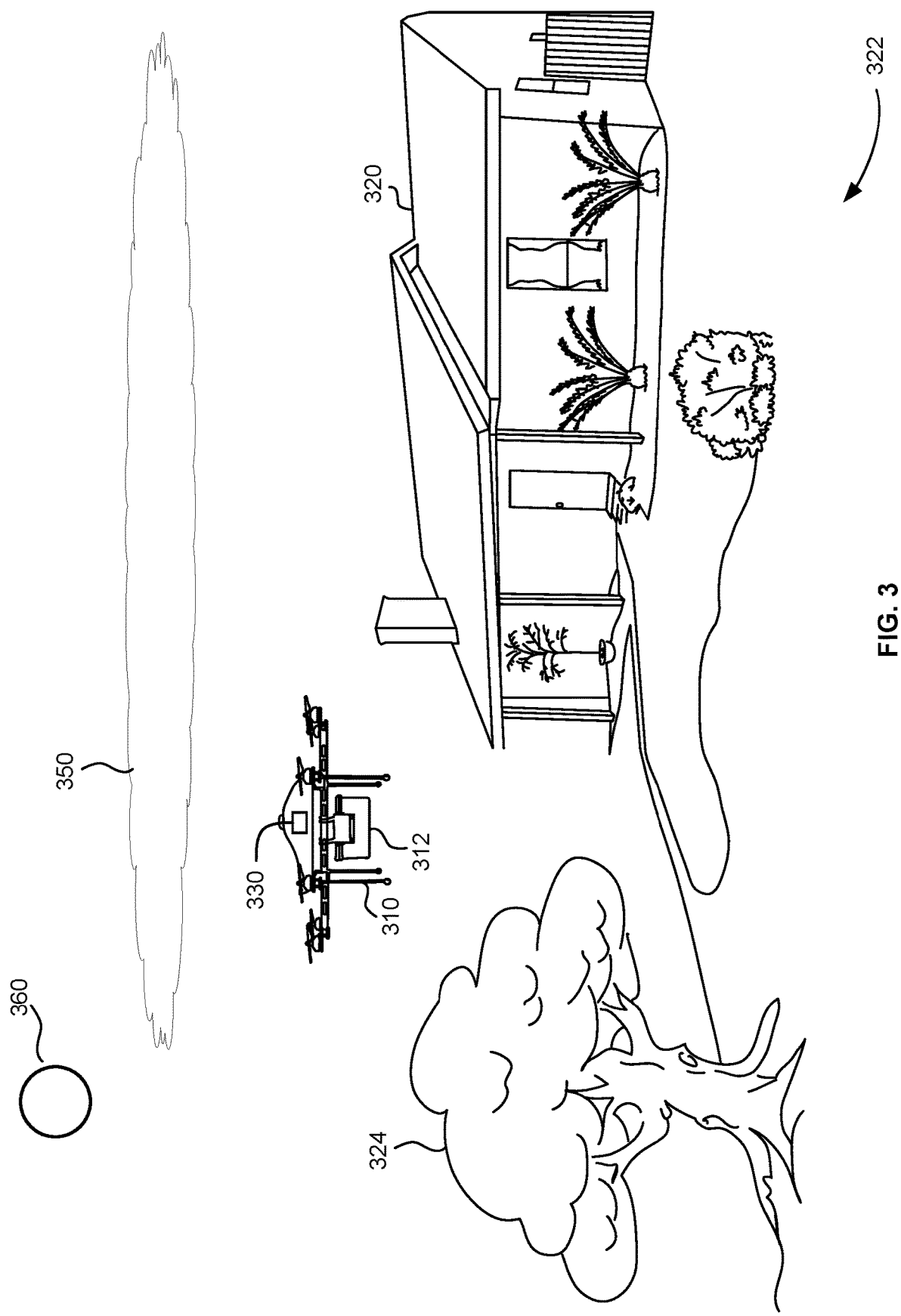
FIG. 3 illustrates an example operational environment, where a UAV implements a camera system, in accordance with an embodiment of the present disclosure.

FIG. 3 illustrates an example operational environment, where a UAV 310 impalements a camera system 330. In the illustrated environment, the UAV 310 may carry a package 312 for delivery to a location 320. The UAV 310 may be deployed to the location 320 associated with a user to deliver the package 312. In this example environment, the location 320 is shown as a dwelling of the user. However, the embodiments described herein are not limited as such and may similarly apply to other types of locations and/or other associations to the user. FIG. 3 also includes a surface 322 and an obstacle 324. The UAV 310 may rely on image data from camera system 330 to maneuver around the obstacle 324 and deliver the package to a delivery surface 322 of the location 320. FIG. 3 further includes a sun 360 and one or more clouds 350. The orientation of the sun 360 and clouds 350 (or lack of clouds) may affect the exposure of the camera system 330 to light within the environment.

In an example, the user may have operated a computing device to access a network-based resource to order an item. Based on this order, the item may be packaged at a facility and loaded on the UAV 310. The UAV 310 may be remotely controlled or autonomously operated to fly the package 312 from the facility to the location 320, deliver the package 312, and return to the facility or to some other location. These operations of the UAV 310 may represent an example mission that the UAV 310 may be deployed to perform.

Upon arrival to the location 320 (e.g., to the exact location 320 or to a vicinity thereof), the UAV 310 may determine a delivery surface 322 to deliver the package 312. FIG. 3 illustrates the delivery surface 322 as a surface of a backyard of the user's dwelling. However, the embodiments described herein are not limited as such and may similarly apply to other types of surfaces and/or other associations to location 320.

Various techniques may be used to determine the surface 322. In one example technique, data about the surface 322, such as spatial coordinates, may be provided to the UAV 310 (e.g., transmitted thereto and stored thereat) prior to leaving the facility, on the way to the location 320, upon or after arrival to the location 320. In another example technique, this data may be generated based on sensors of the UAV 310. For instance, the UAV 310 may be equipped with a number of sensors, such as image, motion, radio frequency, and/or other sensors and one or more processing units to sense and process environmental data associated with the location and generate the data about the surface 322. Of course, a combination of both example techniques may be used. An image sensor of the camera system 330 is an example of sensors that may be used to determine an appropriate landing area on surface 322.

The data about the surface 322, whether received from a remote source and/or locally generated by the UAV 310, may indicate the presence of, for example, the obstacle 324. The obstacle 324 may represent an object that may be static, such as a tree or fence, or that may be moving, such as a wind turbine.

As the UAV 310 approaches the location 320, a contamination check may be determined to detect whether contamination exists on a sensor cover of the camera system 330. In an example, the UAV 310 may maintain its flight position. The image sensor may capture a baseline image of the environment. A light source of the camera system 330 may then be turned on. While the light source is on and the UAV 310 is still in the same flight position, the image sensor may capture a test image of the environment. The two images may be compared to detect the presence of the contamination. If present, the UAV 310 may trigger one or more corrective actions. Some of the corrective actions may depend on the size of the contamination and its potential impact to the quality of the image data. Maintaining the flight position may advantageously allow the UAV 310 to avoid the risk of incorrectly performing a maneuver in case contamination existed. However, in other examples, the UAV 310 need not maintain its flight position to run the contamination check. For instance, depending on the speed of the flight, the speed of image generation, and/or the speed of the image data analysis, the UAV 310 may complete the contamination check without altering its flight path. To illustrate, if the camera system 330 has a high frame rate (e.g., in excess of 250 frames per second), baseline and image data may be generated without a change to the flight path. Similarly, if the frame rate exceeds the flight speed, the flight position may need not be maintained.

One example corrective action may include notifying an operator associated with the UAV 310 and/or the user. The notification may be sent over a wireless data network to computing devices of the operator and/or user. Thereafter, the operator and/or user may remotely control the UAV 310 to avoid the obstacle 324, deliver the package 312, and/or return to a base.

Another example corrective action may include triggering the UAV 310 to use data by the other sensors (e.g., motion, radio frequency, and/or other sensors). The propulsion system of the UAV 310 may be accordingly controlled and instructed to avoid the obstacle 324 based on this sensed data in lieu of or in addition to the image data.

Yet another example corrective action may include triggering a cleaning mechanism of the UAV 310 to remove the contamination off the sensor cover. For example, a wiper system, an air blower, and/or a solution sprayer may be activated. Thereafter, the contamination may be checked again and the process may be iteratively repeated until the contamination is removed and/or a particular number of iterations is reached.

Figure 4:
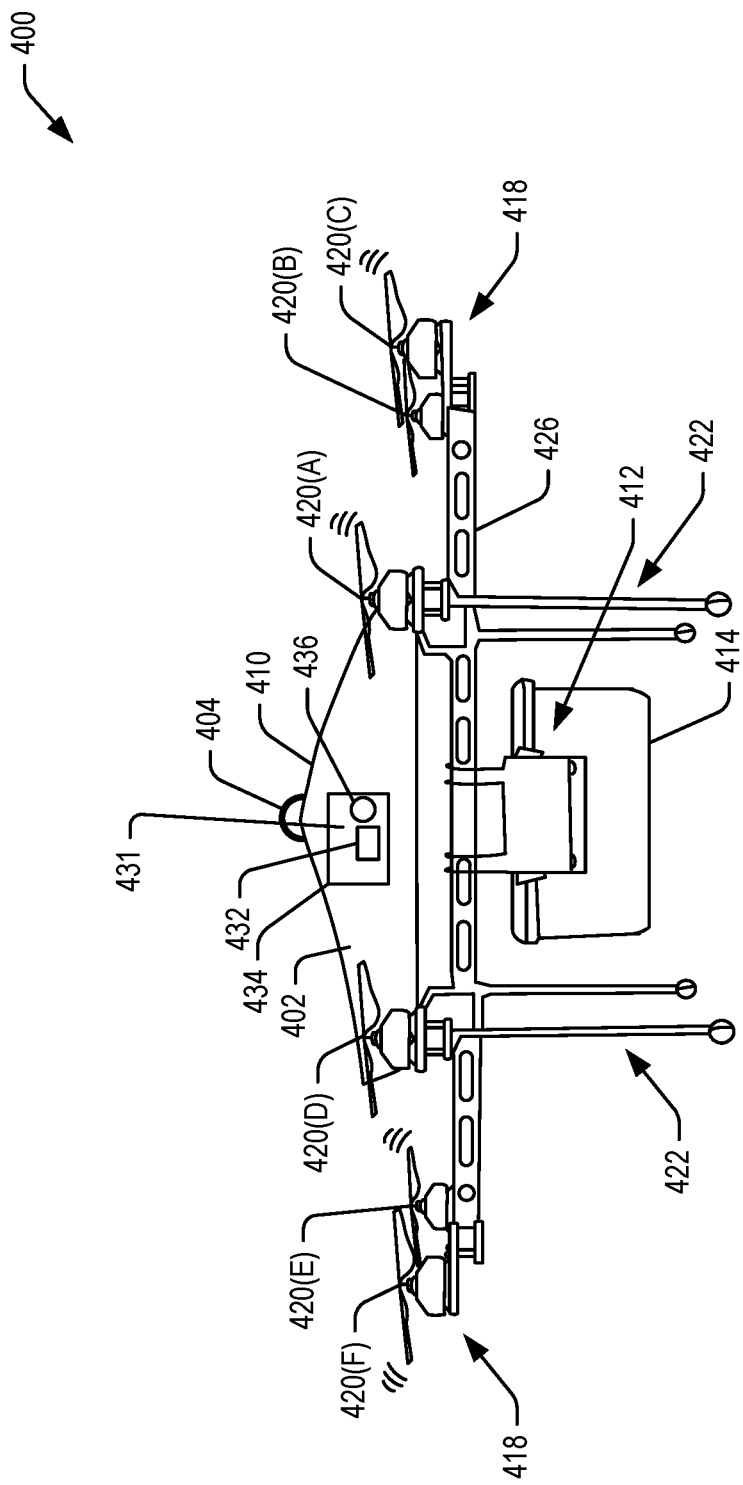
FIG. 4 illustrates an example UAV that may include a camera system, in accordance with an embodiment of the present disclosure.

FIG. 4 illustrates an example UAV 400 that may include a camera system 431. The UAV 400 may be designed in accordance with commercial aviation standards and may include multiple redundancies to ensure reliability. In an example, the UAV 400 may include a plurality of systems or subsystems operating under the control of, or at least partly under the control of, a management system 402. The management system 402 may include an onboard computer for autonomously or semi-autonomously controlling and managing the UAV 400. In one embodiment, the on-board computer of management system 402 serves as the management module 120. Portions of the management system 402, including the onboard computer, may be housed under top cover 410. As used herein, the management system 402 may include a power supply and assemblies (e.g., rechargeable battery, liquid fuel, and other power supplies) (not shown), one or more communications links and antennas (e.g., modem, radio, network, cellular, satellite, and other links for receiving and/or transmitting information) (not shown), one or more navigation devices and antennas (e.g., global positioning system (GPS), inertial navigation system (INS), range finder, Radio Detection And Ranging (RADAR), and other systems to aid in navigating the UAV 400 and detecting objects) (not shown), radio-frequency identification (RFID) capability (not shown).

As shown in FIG. 4, the UAV 400 may also include a retaining system 412. The retaining system 412 may be configured to retain a payload 414, which may be a package for delivering to a user. The UAV 400 may deliver the payload 414 by fully landing on the ground and releasing the retaining system 412. The camera system 431 may be positioned on top cover 410 or on the frame 426 of UAV 400. Although not shown, one or more camera systems 431 may be mounted in different directions (e.g., downward looking cameras to identify ground obstacles and a landing zone for payload 414 while UAV 400 is in flight, sideways to identify side obstacles, etc.).

Further, the UAV 400 includes propulsion system 418. In some examples, the propulsion system 418 may include rotary blades or otherwise be a propeller-based system. The propulsion driver 140 of FIG. 1 may drive electric motors that rotate propellers of the propulsion system. In an example, the propulsion system 418 may include or be associated with one or more fixed wings. As illustrated in FIG. 4, the propulsion system 418 may include a plurality of propeller devices, a few of which, 420(A)-220(F), are shown in this view. Each propeller device may include one propeller, a motor, wiring, a balance system, a control mechanism, and other features to enable flight. In some examples, the propulsion system 418 may operate at least partially under the control of the management system 402. In some examples, the propulsion system 418 may be configured to adjust itself without receiving instructions from the management system 402. Thus, the propulsion system 418 may operate semi-autonomously or autonomously. The propulsion system 418 may enable multi-directional flight of the UAV 400 (e.g., by adjusting each propeller device individually). The UAV 400 may also include landing structure 422. The landing structure 422 may be adequately rigid to support the UAV 400 and the payload 414. The landing structure 422 may include a plurality of elongated legs which may enable the UAV 400 to land on and take off from a variety of different surfaces. The plurality of systems, subsystems, and structures of the UAV 400 may be connected via the frame 426. The frame 426 may be constructed of a rigid material and be capable of receiving via different connections the variety of systems, sub-systems, and structures. For example, the landing structure 422 may be disposed below the frame 426 and, in some examples, may be formed from the same material and/or same piece of material as the frame 426. The propulsion system 418 may be disposed radially around a perimeter of the frame 426 or otherwise distributed around the frame 426.

In an example, the camera system 431 may include an image sensor 432, a light sensor cover 434 and a light source 436. The camera system 431 may interface with and generate and provide image data to the management system 402. Although not shown in FIG. 4, the UAV 400 may also include a number of other components to support the image data generation and/or corrective actions.

For example, the UAV 400 may also integrate a blackout system. The blackout system may include a pivoting structure coupled with a motor and a light absorbing material (e.g., blackout fabric, light absorbing foil or polymer, molded plastic with a blackout surface, etc.). The camera system 431 may include or interface (directly or indirectly through the management system 302) with the blackout system. The blackout system may be used to improve the quality of the contamination check. In particular, in a bright light environment (e.g., as in FIG. 3 when the sun 360 is out and the cloud 350 not present), the differences between baseline and test image data may not be significant enough to properly detect the contamination. Instead, the blackout system may be operated such that the light absorbing material may cover the sensor cover 434 to substantially reduce the light exposure. While covered, the baseline image data may be first generated. Next, the light source 436 may be turned on and the test image data may be generated. Thereafter, the blackout system may be operated to uncover the sensor cover 434.

In another example, the UAV 400 may include integrate a contamination removal system. The system may include a motor, a reservoir, and any of a wiper system including wipers, an air blower system including outlets and an air pressurizer, and/or a solution sprayer system including a solution (e.g., a bio-friendly chemical), a solution pressurizer, and outlets. The selection and integration of the subsystems (e.g., the wiper system, air blower system, solution sprayer system) may depend on the operational environment of the UAV 400. In particular, the operational environment may result in a particular type of contamination. The appropriate subsystem may be integrated to most efficiently remove the contamination without damaging the sensor cover. For instance, in a desert environment, dust and dirt may be expected. Accordingly, the air blower system may be implemented. In comparison, in a moist and warm environment, water may be expected. The wiper system may be implemented. On the other hand, in a cold environment, ice may be expected. The solution sprayer system may be implemented. Regardless, the management system 302 may interface with the contamination removal system. Upon detection of the contamination, the management system may trigger a corrective action that includes a notification to the contamination removal system and instructions for removing the contamination.

Figure 5:
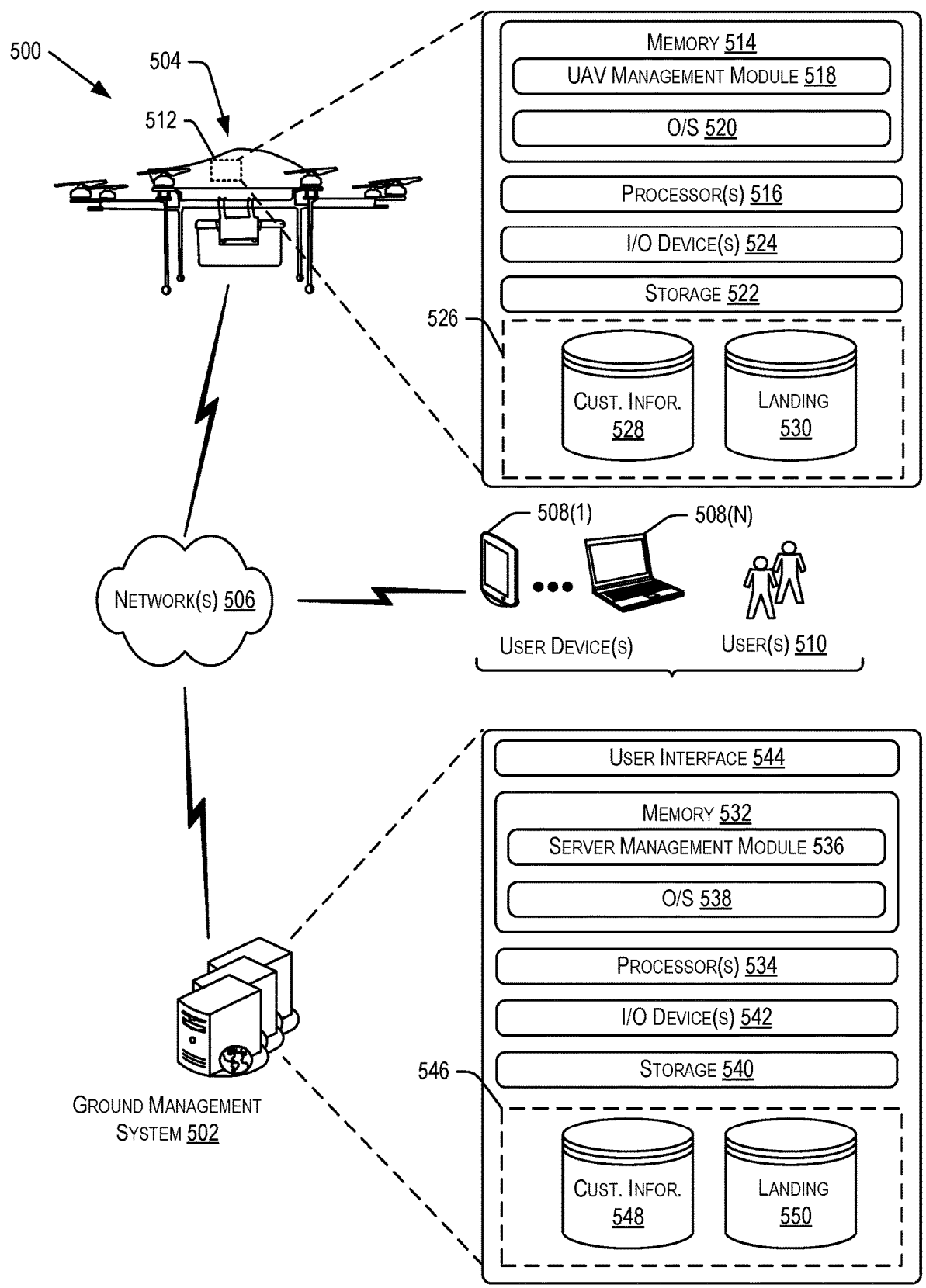
FIG. 5 illustrated an example architecture for using a UAV for a particular mission, in accordance with an embodiment of the present disclosure.

FIG. 5 illustrated an example architecture 500 for using a UAV 504 for a particular mission. FIG. 5 illustrates a package delivery mission, although other missions are likewise possible. The architecture 500 may include a ground management system 502. The ground management system 502 may support an electronic marketplace (not shown) and interface with purchase and delivery services of the electronic marketplace. In this manner, the ground management system 502 may coordinate delivery of items via UAVs, such as UAV 504, to customers of the electronic marketplace. In some examples, the ground management system 502 may be a stand-alone service operated on its own or in connection with an electronic marketplace. In either example, the ground management system 502 may be in communication with the UAV 504 via one or more network(s) 506 (hereinafter, "the network 506"). The network 506 may include any one or a combination of many different types of networks, such as cable networks, the Internet, wireless networks, cellular networks, radio networks, and other private and/or public networks. Thus, the ground management system 502 may be configured to provide back-end control of the UAV 504 prior to, during, and after completion of its delivery plan. As discussed previously, in some examples, the UAV 504 may be configured to accomplish its delivery plan (e.g., deliver its payload) with little to no communication with the ground management system 502.

User devices 508(1)-508(N) (hereinafter, "the user device 508") may also be in communication with the ground management system 502 and the UAV 504 via the network 506. The user device 508 may be operable by one or more human users 510 (hereinafter, "the human user 510") to access the ground management system 502 (or an electronic marketplace) and the UAV 504 via the network 506. The user device 508 may be any suitable device capable of communicating with the network 506. For example, the user device 508 may be any suitable computing device such as, but not limited to, a mobile phone, a smart phone, a personal digital assistant (PDA), a laptop computer, a thin-client device, a tablet PC, a desktop computer, a set-top box, or other computing device. In some examples, the user device 508 may be in communication with the ground management system 502 via one or more web servers constituting an electronic marketplace (not shown) connected to the network 506 and associated with the ground management system 502.

Turning now to the details of the UAV 504, the UAV 504 may include an onboard computer 512 including at least one memory 514 and one or more processing units (or processor(s)) 516. The processor(s) 516 may be implemented as appropriate in hardware, computer-executable instructions, software, firmware, or combinations thereof. Computer-executable instruction, software or firmware implementations of the processor(s) 516 may include computer-executable or machine-executable instructions written in any suitable programming language to perform the various functions described. The memory 514 may include more than one memory and may be distributed throughout the onboard computer 512. The memory 514 may store program instructions (e.g. UAV management module 318 that may implement functionalities of the management module 120 of FIG. 1) that are loadable and executable on the processor(s) 516, as well as data generated during the execution of these programs. Depending on the configuration and type of memory including the UAV management module 518, the memory 514 may be volatile (such as random access memory (RAM)) and/or non-volatile (such as read-only memory (ROM), flash memory, or other memory). The memory 514 may also include additional removable storage and/or non-removable storage including, but not limited to, magnetic storage, optical discs, and/or tape storage. The disk drives and their associated computer-readable media may provide non-volatile storage of computer-readable instructions, data structures, program modules, and other data for the computing devices. In some implementations, the memory 514 may include multiple different types of memory, such as static random access memory (SRAM), dynamic random access memory (DRAM), or ROM. Turning to the contents of the memory 514 in more detail, the memory 514 may include an operating system 520 and one or more application programs, modules or services for implementing the features disclosed herein including at least the UAV management module 518.

In some examples, the onboard computer 512 may also include additional storage 522, which may include removable storage and/or non-removable storage. The additional storage 522 may include, but is not limited to, magnetic storage, optical disks, and/or tape storage. The disk drives and their associated computer-readable media may provide non-volatile storage of computer-readable instructions, data structures, program modules, and other data for the computing devices.

The memory 514 and the additional storage 522, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the onboard computer 512. The modules of the onboard computer 512 may include one or more components. The onboard computer 512 may also include input/output (I/O) device(s) and/or ports 524, such as for enabling connection with a keyboard, a mouse, a pen, a voice input device, a touch input device, a display, speakers, a printer, or other I/O device. The I/O device(s) 524 may enable communication with the other systems of the UAV 504 (e.g., other parts of the control system, power system, communication system, navigation system, propulsion system, and the retaining system).

The onboard computer 512 may also include data store 526. The data store 526 may include one or more databases, data structures, or the like for storing and/or retaining information associated with the UAV 504. In some examples, the data store 526 may include databases, such as customer information database 528 and landing zone database 530. Within the customer information database 528 may be stored any suitable customer information that may be used by the UAV 504 in implementing and/or affecting its delivery plan. For example, the customer information database 528 may include profile characteristics for the human user 510. The profile characteristics may include a shipping address. The landing zone database 530 may store suitable landing zones or drop-off zones associated with a particular user. The landing zone database 530 may include GPS coordinates and/or images of landing zones associated with a particular user.

Turning now to the details of the user device 508. The user device 508 may be used by the human user 510 for interacting with the ground management system 502. The user device 508 may therefore include a memory, a processor, a user-interface, a web-service application, and any other suitable feature to enable communication with the features of architecture 500. The web service application may be in the form of a web browser, an application programming interface (API), virtual computing instance, or other suitable application. In some examples, when the ground management system 502 is part of, or shares an association with, an electronic marketplace, the user device 508 may be used by the human user 510 for procuring one or more items from the electronic marketplace. The human user 510 may request delivery of the purchased item(s) using the UAV 504, or the ground management system 502 may coordinate such delivery on its own.

The ground management system 502 may include or be integrated with one or more service provider computers, perhaps arranged in a cluster of servers or as a server farm, and may host web service applications. These servers may be configured to host a website (or combination of websites) viewable via the user device 508. The ground management system 502 may include at least one memory 532 and one or more processing units (or processor(s)) 534. The processor(s) 534 may be implemented as appropriate in hardware, computer-executable instructions, software, firmware, or combinations thereof. Computer-executable instruction, software or firmware implementations of the processor(s) 534 may include computer-executable or machine-executable instructions written in any suitable programming language to perform the various functions described. The memory 532 may include more than one memory and may be distributed throughout the ground management system 502. The memory 532 may store program instructions (e.g., server management module 536) that are loadable and executable on the processor(s) 534, as well as data generated during the execution of these programs. Depending on the configuration and type of memory including the server management module 536, the memory 532 may be volatile (such as random access memory (RAM)) and/or non-volatile (such as read-only memory (ROM), flash memory, or other memory). The ground management system 502 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 532 may include multiple different types of memory, such as static random access memory (SRAM), dynamic random access memory (DRAM), or ROM.

Turning to the contents of the memory 532 in more detail, the memory 532 may include an operating system 538 and one or more application programs, modules or services for implementing the features disclosed herein including at least the server management module 536. The server management module 536, in some examples, may function similarly to the UAV management module 518. For example, when the UAV 504 is in network communication with the ground management system 502, the UAV 504 may receive at least some instructions from the ground management system 502 as the server management module 536 is executed by the processors 534. In some examples, the UAV 504 executes the UAV management module 518 to operate independent of the ground management system 502.

In some examples, the ground management system 502 may also include additional storage 540, which may include removable storage and/or non-removable storage. The additional storage 540 may include, but is not limited to, magnetic storage, optical disks, and/or tape storage. The disk drives and their associated computer-readable media may provide non-volatile storage of computer-readable instructions, data structures, program modules, and other data for the computing devices.

The memory 532 and the additional storage 540, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the ground management system 502. The modules of the ground management system 502 may include one or more components. The ground management system 502 may also include input/output (I/O) device(s) and/or ports 542, such as for enabling connection with a keyboard, a mouse, a pen, a voice input device, a touch input device, a display, speakers, a printer, or other I/O device.

In some examples, the ground management system 502 may include a user interface 544. The user interface 544 may be utilized by an operator, or other authorized user to access portions of the ground management system 502. In some examples, the user interface 544 may include a graphical user interface, web-based applications, programmatic interfaces such as application programming interfaces (APIs), or other user interface configurations. The ground management system 502 may also include data store 546. The data store 546 may include one or more databases, data structures, or the like for storing and/or retaining information associated with the ground management system 502. The data store 546 may include databases, such as customer information database 548 and landing zone database 550. The customer information database 548 and the landing zone database 550 may include similar information as the customer information database 528 and the landing zone database 530 of the onboard computer 512. The ground management system 502 may store a larger amount of information in the data store 546 than the onboard computer 512 is capable of storing in the data store 526. Thus, in some examples, at least a portion of the information from the databases in the data store 546 is copied to the databases of the data store 526, e.g., periodically, occasionally, in connection with an event, or otherwise. In this manner, the data store 526 may have up-to-date information, without having to maintain the databases. In some examples, this information may be transferred as part of a delivery plan prior to the UAV 504 beginning a delivery mission.

Figure 6:
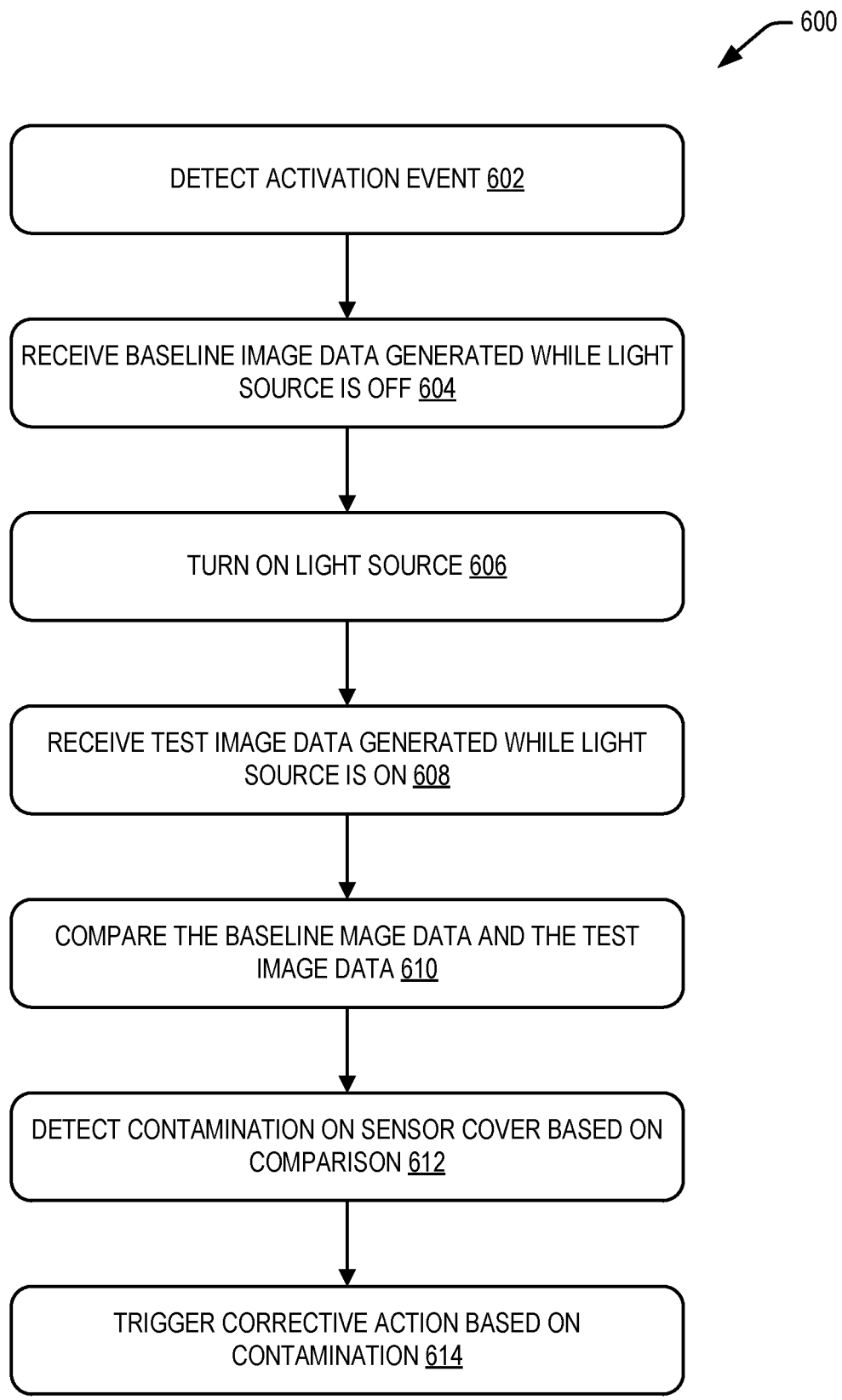
FIG. 6 illustrates an example flow 600 for detecting contamination and triggering one or more corrective actions, in accordance with an embodiment of the present disclosure.
Figure 7:
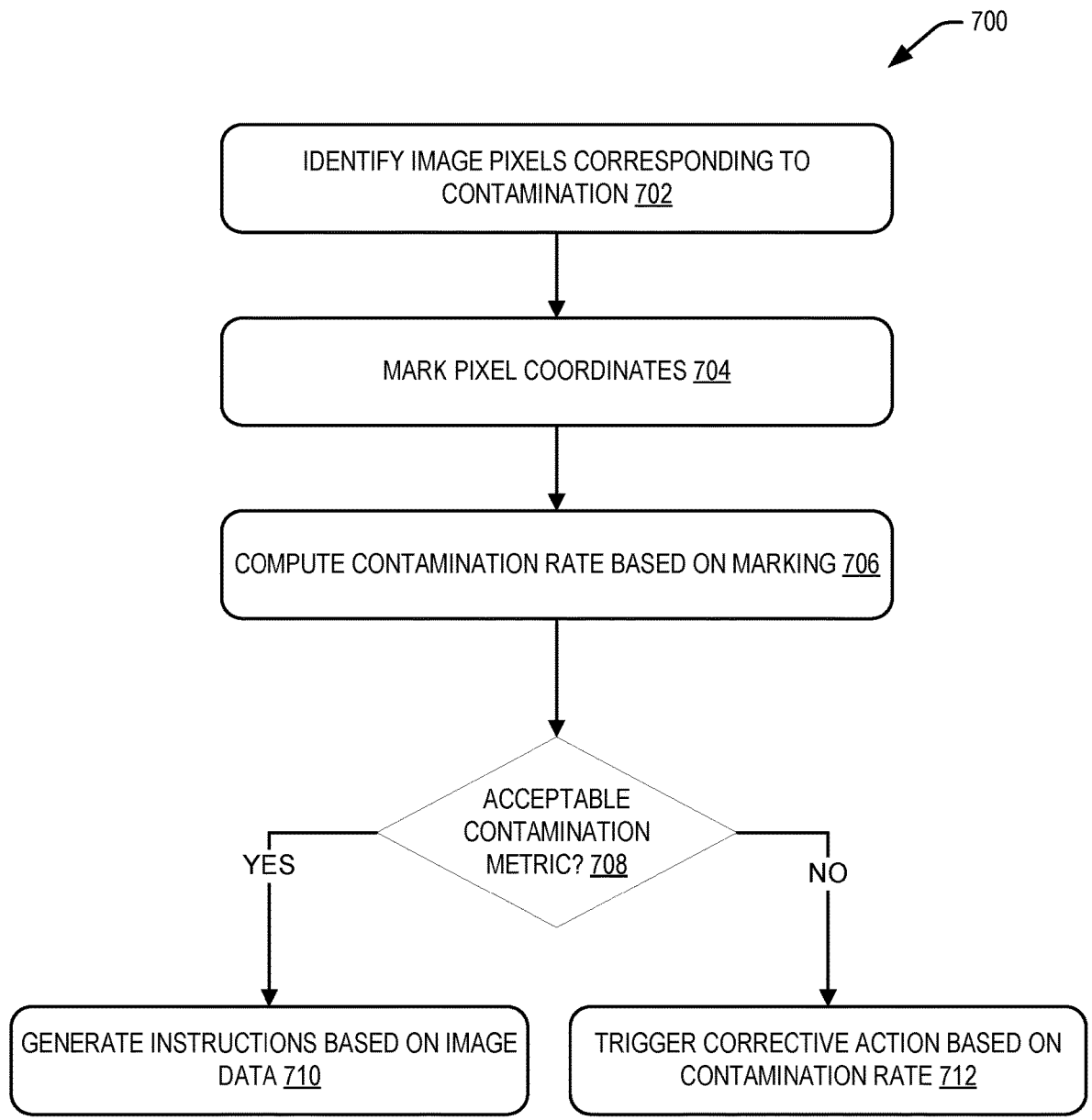
FIG. 7 illustrates an example flow for determining a reliability level of image data given the presence of contamination, in accordance with an embodiment of the present disclosure.

FIGS. 6-7 illustrate example flows for managing contamination present on a sensor cover of a camera system of a UAV (and, similarly, other types of vehicle). In the example flows, some of the operations may be embodied in, and fully or partially automated by, components executed by one or more processors hosted on a server and/or a client device. A management module is an example of such components. While the operations are illustrated in a particular order, it should be understood that no particular order is necessary and that one or more operations may be omitted, skipped, and/or reordered. In addition, some of the operations may be similar across the example flows. Such similarities are not repeated herein in the interest of clarity of explanation.

FIG. 6 illustrates an example flow 600 for detecting contamination and triggering one or more corrective actions. The flow 600 may start at operation 602, where the management module may detect an activation event. Based on the activation event, the management module may control components of the camera system and other systems of the UAV to detect whether the contamination is present on the sensor cover and trigger one or more corrective actions. The control may include any of instructing activating an image sensor of the camera system, turning on a light source of the camera system, activating a blackout system, and/or activating a contamination removal system. Various activation events may be possible. In an example, the management module may receive a command of an operator of the UAV to check for the contamination, where the command may be sent via a ground management system. In another example, the management module may automatically run the check based on a predefined cycle, a time of day (e.g., when the light exposure is reduced or to a minimum), or when the UAV is at a particular location with a known light exposure (e.g., a low light exposure environment). In this example, the activation event may increase the likelihood of a successful check based on a proper low light exposure environment. In yet another example, the management module may automatically run the check as the UAV is about to start a particular mission or a maneuver of the mission (e.g., as the UAV is within a certain threshold distance from an obstacle). In this example, the contamination check may be run just in time to ensure that the most up-to-date diagnostic of the contamination is performed.

At operation 604, the management module may receive baseline image data from an image sensor of the camera system. The baseline image data may be generated while a light source of the camera system is off. In an example, the management module may instruct a propulsion system of the UAV to maintain a flight position for a period of time. During that period of time, the management module may check that the light source is off (and turn it off if it is in an on state) and may activate the image sensor to capture an image of an external environment of the UAV. In response, the management module may receive the baseline image data from the camera system, where the baseline image may represent the image.

At operation 606, the management module may turn on the light source. For example, the management module may send instructions to the camera system to switch the light source from the off state to an on state. These instructions may be provided while the UAV remains in its flight position.

At operation 608, the management module may receive test image data from the image sensor. The image sensor may generate the test image data during the time period during which the UAV remains in its flight position and while the light source is on. In an example, the management module may activate the image sensor to generate the test image data. In another example, the image sensor may automatically generate this data. In this example, the camera system and/or the management module may mark the data as being test image data based on the on state of the light source.

At any of operations 604-608, the management module may further determine a level of light exposure to which the image sensor is subject. The light exposure may be from the ambient light of the external environment. If the level exceeds a predefined exposure threshold, the confidence in the analysis of the baseline and test image data may be low because of an acceptable high level of light exposure. In this case, the management module may reschedule the contamination check (e.g., for a later time of the day or for another location, where the level may fall below the exposure threshold), may reposition the UAV to reduce the light exposure on the image sensor, and/or may activate the blackout system to cover the sensor cover and thereafter generate baseline and test image data.

Different techniques may be available for detecting the light exposure level. One technique may rely on the baseline image data and/or the test image data. In this example, an image histogram may be generated from either data to analyze the brightness in the respective image. That brightness may be used for the light exposure level. In another example, the UAV may include a light incident meter (or sensor). The light incident meter may be integrated or interface with the camera system. The management module (or the camera system) may analyze measurements from the light incident meter to determine whether the exposure threshold is exceeded or not. In an example, once the light exposure level may be acceptable (e.g., below the exposure threshold), remaining operations of the flow 600 may be performed to complete the contamination check. Performing the remaining operations may also involve turning off the light source and deactivating the blackout system to uncover the sensor cover. In addition, the management module may instruct the propulsion system to proceed with the flight and/or maintain the flight position until the contamination check is complete.

At operation 610, the management module may compare the baseline image data and the test image data. Different analysis techniques may be available for the comparison. One technique may compare image histograms to detect contrast and shadow differences between the two types of data. For example, the management module may generate a baseline image histogram from the attributes of the pixels in the baseline image and may similarly generate a test image histogram from the attributes of the pixels in the test image. Generally, an image histogram may include a graphical representation of a tonal distribution. A horizontal axis of the graph may represent the tonal variations, while the vertical axis represents the number of pixels in that particular tone. The left side of the horizontal axis may represent the black and dark areas. Accordingly, the left sides of the horizontal axis (e.g., distribution of dark pixels) and/or right sides of the horizontal axis (e.g., distribution of bright pixels) across the baseline image histogram and the test image histogram may be compared. Differences between the two may be measured against a contrast threshold. If exceeding the contrast threshold, the management module may detect the presence of the contamination.

In another technique, sharpness of the baseline image may be compared to the sharpness of the test image. If the contamination exists, the sharpness in the test image may be expected to be higher because of the light scattered from the contamination in response to the light emitted from the light source. In this example, the management module may apply a Fourier transformation to each of the baseline image data and test image data to generate the respective sharpness. The sharpness across the two images may be compared to compute a difference. The management module may detect the presence of the contamination if the difference exceeds a sharpness threshold.

Each of the contrast threshold and sharpness threshold may represent an example of a contamination threshold and may be predefined based on AB testing and/or operational parameters of a provider (e.g., designer or manufacturer) of the camera system or of the UAV. For example, through design and/or testing, the sensitivity of the contamination check may be developed based on the analysis technique. Each of the contamination thresholds may be predefined accordingly.

At operation 612, the management module may detect whether the contamination exists or not on the sensor cover based on the comparison. For example, and depending on the analysis technique at operation 610, the management module may compare the differences (e.g., between the image histograms and/or sharpness) to the appropriate contamination threshold. If the contamination threshold is exceeded, the management module may detect the presence of the contamination. Otherwise, the management module may detect that no contamination exists.

At operation 614, the management module may trigger a corrective action based on the contamination. In an example, the corrective action may be performed by a subscribed system local or remote to the UAV (e.g., a system that may interface with the management module, such as a propulsion system of the UAV). Triggering the corrective action may include sending a notification about the contamination to the subscribed system.

In an example, the notification may be a binary notification (e.g., presence or absence of contamination). In another example, the notification may also include an estimate of a reliability of the image data that is subsequently sensed by the image sensor, where the reliability level may be a function of the detected contamination. An example flow for deriving the reliability level is further described in FIG. 7. The subscribed system may rely on the reliability level to keep using the image data, update the usage by weighing the image data, or discarding the image data altogether. For instance, if the reliability level exceeds a first reliability threshold, the subscribed system may keep using the image data. If the reliability level falls between the first reliability threshold and a second reliability threshold, the subscribed system may supplement the usage of the image data with usage of data sensed by other sensors (e.g., location sensor, radio frequency sensor, radars, etc.). The image data and the sensed data may be weighted differently (e.g., more weight may be given to the sensed data because the image data is less reliable). If the reliability level falls below the second threshold, the subscribed system may stop using the image data and may rely instead on the sensed data. The first and second reliability thresholds may be predefined based on AB testing and/or operational parameters of the provider of the UAV, the camera system, or the subscribed system.

In a further example, the notification may also include instructions for mitigating the impact of the contamination. For instance, the management module may instruct the subscribed system to perform a particular adjustment (e.g., to activate particular sensor and/or use particular sensed data) and/or operation (e.g., to reposition the UAV for additional imaging).

To illustrate, consider the propulsion system and a contamination removal system of the UAV as an example of the subscribed system. In this illustrative example, the management module may notify the propulsion system about the contamination. In addition, the management module may switch off the camera system and may activate a redundant camera system and/or auxiliary sensors (e.g., the location sensor and radio frequency sensor). Based on the data sensed from the activated sensor(s), the management system may detect a ground obstacle and may instruct the propulsion system to adjust the propulsion of the UAV such that the ground obstacle is avoided. Thus, rather than relying on the image data of the contaminated camera system, the sensed data is used for obstacle avoidance. In addition, the management module may notify the contamination removal system of the contamination. In response, the contamination removal system may automatically activate a wiper system, an air blower, or a solution sprayer, as applicable, to remove the contamination. Iteratively, the management module may perform the contamination check and further notify the contamination removal system.

Different types of corrective action may be possible. In addition to sending notifications and/or instructions to subscribed system effectuate controls over such systems, the corrective actions may include sending notifications and/or instructions to user computing devices for presentation at user interfaces.

FIG. 7 illustrates an example flow 700 for determining a reliability level of image data given the presence of contamination. Generally, the size and/or distribution of the contamination over the sensor cover may obstruct the field of view of the image sensor, thereby degrading the quality and usability of the captured images. The management module may compute a contamination metric from the baseline image data and the test image data. The contamination metric may reflect the number of pixels in an image that may be impacted by the contamination (e.g., an impacted pixel may correspond to a portion of the contamination instead of the external environment). In an example, the contamination metric represents a rate of the contamination. The larger the contamination rate, the larger the number of impacted pixels, and, thus, the lower the reliability level of the image data may be.

The flow 700 may start at operation 702, where the management module may identify image pixels corresponding to the contamination (e.g., the impacted pixels). Different identification techniques may be possible and may rely on a comparison of the baseline image histogram and the test image histogram and/or on a comparison of the sharpness of the baseline image and sharpness of the test image.

One example technique may rely on attributes of the image pixels. In this example, a pixel at one coordinate in the baseline image may be compared to a pixel at the same coordinate in the test image. The comparison may involve comparing the light intensities or pixel color values. If a difference is detected (e.g., different non-contiguous color on an RGB scale), the management module may identify that these two pixels (and, equivalently, the pixel coordinates) correspond to the contamination. The comparison process may be repeated across the various pixels.

Another example technique may rely on properties of the sections of the images. In this example, an iterative search may be performed to identify particular sections as corresponding to the contamination. For instance, each of the baseline image and test image may be divided into corresponding sections at a starting resolution (e.g., the starting resolution for a section size may be half of the image size), thereby forming image section pairs. Image histograms and/or sharpness of the sections may be generated. A baseline image section may be compared to a corresponding test image section, where the comparison may be based on the respective image histograms and/or sharpness. If a significant difference is detected (e.g., one that is greater than a predefined threshold), the pair may be identified as corresponding to the contamination. Otherwise, the pair may be removed from the analysis. The comparison may be repeated across the various image section pairs, thereby identifying the image section pairs that may correspond to the contamination. Next, each such pairs may be considered for further analysis at a next resolution. For instance, each of a baseline image section and test image section from a considered pair may be divided into new sections at the next resolution (e.g., section size that may be half of the last section size) be divided into new image sections for a similar comparative analysis. This iterative process may be repeated until a final resolution (e.g., a four pixel by four pixel section size). At the end of the analysis, a set of baseline image section and test image section pairs may be identified as corresponding to the contamination.

At operation 704, the management module may mark pixel coordinates as corresponding to the contamination or not. The marking may depend on the analysis technique at operation 702. For instance, if the pixel analysis is used, the pixels of the baseline image and/or the pixels of the test image are identified as corresponding or not to the contamination. Coordinates of either the baseline or test pixels that correspond to a portion of the contamination may be marked as corresponding to a portion of the contamination. On the other hand, if the image section analysis is used, baseline image sections or test image sections are identified as corresponding or not to the contamination. Each section may have corners pixels. Coordinates of corner pixels of either a baseline image section or a corresponding test image section may be marked as corresponding to a portion of the contamination or not depending on whether the baseline image section or the corresponding test image section corresponds to the portion of the contamination or not.

At operation 706, the management module may compute a contamination metric based on the marking. The computation may also depend on the analysis technique at operation 702. For instance, if the pixel analysis is used, the contamination metric may be a function of the total number of pixels marked as corresponding to the contamination and the number of the remaining pixels (e.g., a ratio of the two to generate a contamination rate). On the other hand, if the image section analysis is used, a total size (e.g., pixel area) may be derived from the baseline image sections or the test image sections marked as corresponding to the contamination. The contamination metric may be a function of this total size and the remaining size (e.g., a ratio of the two to generate a contamination rate).

At operation 708, the management module may determine whether the contamination metric may be acceptable or not. For example, the management module may compute a reliability level as a function of the contamination metric (e.g., an inverse of the contamination rate, where the higher the contamination rate, the lower the liability rate may be and, thus, the less reliable the image data may be). The reliability level may be compared to the first reliability threshold and the second reliability threshold described in connection with the flow 600 of FIG. 6. If the reliability level is greater than the first reliability threshold, the contamination metric may be acceptable. Accordingly, the management module may follow operation 710, where the management module may use the image data for the mission of the UAV. For instance, the management module may generate instructions based on the image data. Hence, the management module may direct the propulsion system of the UAV to avoid an obstacle based on image data about the obstacle and captured by the camera system. If the reliability level is lower than the first reliability threshold or the second reliability threshold, the contamination metric may be unacceptable to properly perform the mission using only the image data. Accordingly, the management module may follow operation 712. At operation 712, the management module may trigger a corrective action based on the contamination metric. In particular, if the reliability level is between the two thresholds (or, equivalently, the contamination rate is greater than the second reliability threshold), the management module may generate instructions by weighting the image data relatively lower than other sensed data. If the reliability level is lower than the second threshold (or, equivalently, the contamination rate is smaller than the first reliability threshold), the management module may disregard the image data and may, instead, rely on the other sensed data.

Figure 8:
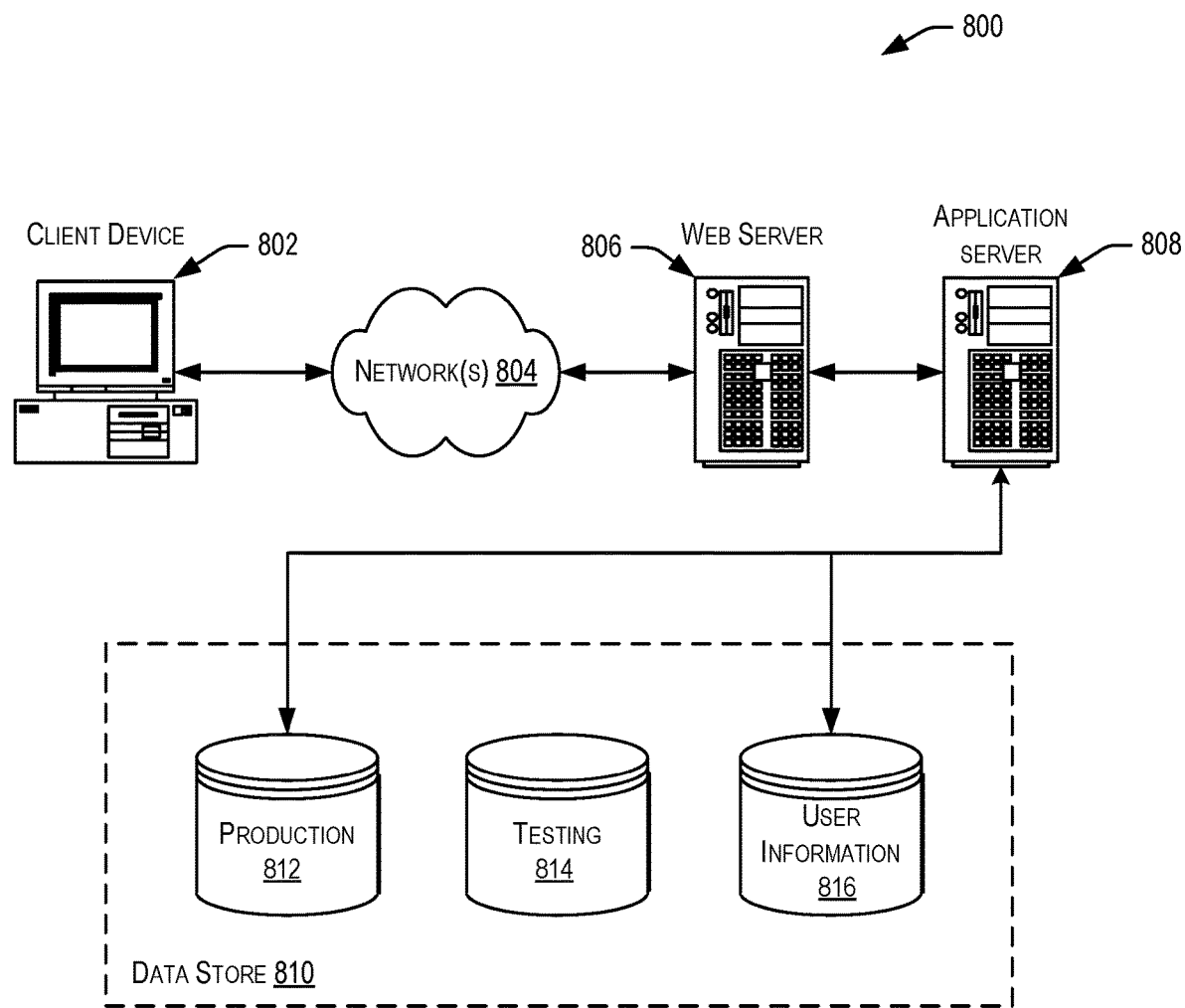
FIG. 8 illustrates aspects of an example computing environment for implementing aspects in accordance with various embodiments.

FIG. 8 illustrates aspects of an example computing environment 800 for implementing aspects in accordance with various embodiments. The computing environment 800 may host certain functionalities of a management module and/or a ground management system. As will be appreciated, although a Web-based environment is used for purposes of explanation, different environments may be used, as appropriate, to implement various embodiments. The environment 800 includes an electronic client device 802, which can include any suitable device operable to send and receive requests, messages or information over a suitable network 804 and convey information back to a user of the device. Examples of such client devices include personal computers, cell phones, handheld messaging devices, laptop computers, set-top boxes, personal data assistants, electronic book readers, or other client devices. The network can include any suitable network, including an intranet, the Internet, a cellular network, a local area network or any suitable such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for accessing requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein the term "data store" refers to any suitable device or combination of devices capable of storing, accessing and retrieving data, which may include any suitable combination and number of data servers, databases, data storage devices and data storage media, in any suitable standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the electronic client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In some examples, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the environment 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of suitable applications. User or client devices can include any suitable number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of suitable commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any suitable combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation, those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any suitable method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any suitable medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An unmanned aerial vehicle (UAV), comprising:
   a frame;
   a propulsion system to generate lift and facilitate a flight of the UAV, the propulsion system associated with the frame;
   an image sensor comprising a sensing surface positioned to capture an image of an environment of the UAV;
   a sensor cover of the image sensor, the sensor cover positioned outwardly from the image sensor and forming a covered volume that is around at least the sensing surface of the image sensor and that is transparent to the image sensor;
   a light source positioned in the covered volume, outside of a field of view of the image sensor, and at an angle relative to the sensing surface such that a reflection of the light source from the sensor cover is outside the field of view; and
   a management module coupled with the image sensor and the light source, wherein the management module is configured to:
      activate the image sensor to generate baseline image data of the environment, wherein the baseline image data is generated based at least in part on the light source being turned off;
      turn on the light source;
      activate the image sensor to generate test image data of the environment, wherein the test image data is generated based at least in part on the light source being turned on;
      determine that a contamination exists on the sensor cover based at least in part on a comparison of the test image data and baseline image data; and
      trigger, based at least in part on the contamination, a corrective action associated with the flight of the UAV, the corrective action comprising deactivating the image sensor and changing an ongoing use of another sensor of the UAV to manage the flight.

2. The UAV of claim 1, wherein the determining that the contamination exists comprises:
   determining a difference between at least one of: a test image histogram and a baseline image histogram, or a test image sharpness to a baseline image sharpness, wherein the test image histogram and the test image sharpness are based at least in part on the test image data, and wherein the baseline image histogram and the baseline image sharpness are based at least in part on the baseline image data; and
   comparing the different to a threshold to detect the contamination.

3. The UAV of claim 2, wherein the management module is further configured to manage operations of the propulsion system to avoid an obstacle based at least in part on sensed image data from the image sensor, and wherein the threshold is predefined based at least in part on a contamination limit for successful obstacle avoidance.

4. The UAV of claim 1, wherein the image sensor is configured to sense the test image data based at least in part on a light wavelength range, and wherein the light source is configured to emit light wavelengths within the light wavelength range.

5. A system associated with a vehicle, the system comprising:
   an image sensor comprising a sensing surface positioned to capture an image of an environment;
   a sensor cover positioned outwardly from the image sensor and forming a covered volume around at least the sensing surface of the image sensor;
   a light source positioned in the covered volume and outside of a field of view of the image sensor and at an angle relative to the sensing surface such that a reflection of the light source from the sensor cover is outside the field of view; and
   a management module coupled with the image sensor, wherein the management module is configured to:
      receive test image data of the environment from the image sensor, wherein the test image data is generated based at least in part on the light source being turned on;
      compare the test image data to baseline image data, wherein the baseline image data is generated based at least in part on the light source being turned off;
      detect whether a contamination exists on a surface of the sensor cover based at least in part on an outcome of the comparing; and
      trigger, based at least in part on the contamination being existent, a corrective action associated with a propulsion operation of the vehicle, the corrective action comprising deactivating the image sensor and changing a use of another sensor of the vehicle to manage the propulsion operation.

6. The system of claim 5, wherein the system is integrated in an unmanned aerial vehicle (UAV), and wherein the management module is further configured to:
   activate the image sensor to generate the baseline image data of the environment based at least in part on the light source being turned off;

turn on the light source;

activate the image sensor to generate the test image data of the environment based at least in part on the light source being turned on; and trigger, based at least in part on the contamination being detected, a corrective action associated with a flight of the UAV, wherein the flight is facilitated by a propulsion system of the UAV.

7. The system of claim 5, wherein the system is integrated in the vehicle, and further comprising a propulsion system coupled with the management module, and wherein the management module is further configured to:

instruct the propulsion system to halt movement of the vehicle;

activate the image sensor to generate the test image data and the baseline image data of the environment based at least in part on the movement of the vehicle being halted; and generate a notification the propulsion system that the contamination exists on the sensor cover, the notification triggering the corrective action associated with the propulsion system.

8. The system of claim 5, further comprising: a light absorbing material, wherein the test image data and the baseline image data are generated based at least in part on placement of the light absorbing material over the sensor cover.

9. The system of claim 5, wherein the system is integrated in the vehicle, and wherein the management module is further configured to:

determine that exposure from ambient light falls below an exposure threshold, the exposure determined based at least in part on the baseline image data or a light exposure sensor of the vehicle;

turn on the light source based at least in part on the exposure falling below the exposure threshold; and activate the image sensor to generate the test image data based at least in part on the light source being turned on.

10. The system of claim 5, wherein the system is integrated in the vehicle, and wherein the management module is further configured to:

turn on the light source based at least in part on a time of day or vehicle location, wherein a likelihood that exposure from ambient light falls below an exposure threshold is increased based at least in part on the time of day or the vehicle location; and activate the image sensor to generate the test image data and baseline image data based at least in part on the light source being turned on.

11. The system of claim 5, wherein the system is integrated in the vehicle, and wherein the management module is further configured to:

determine that a location of the vehicle corresponds to a known location having a known light exposure level;

turn on the light source based at least in part the known location; and activate the image sensor to generate the test image data and baseline image data based at least in part on the light source being turned on.

12. A computer-implemented method comprising:

activating an image sensor of a vehicle to generate baseline image data of an environment of the vehicle, wherein the baseline image data is generated based at least in part on a light source being turned off, the light source positioned between the image sensor and a sensor cover of the image sensor and outside of a field of view of the image sensor and at an angle relative to a sensing surface of the image sensor such that a reflection of the light source from the sensor cover is outside the field of view;

turning on the light source;

activating the image sensor to generate test image data of the environment, wherein the test image data is generated based at least in part on the light source being turned on;

determining that a contamination exists on the sensor cover based at least in part on a comparison of the test image data and baseline image data; and triggering, based at least in part on the contamination, a corrective action associated with a propulsion operation of the vehicle, the corrective action comprising deactivating the image sensor and changing a use of another sensor of the vehicle to manage the propulsion operation.

13. The computer-implemented method of claim 12, wherein turning on the light source is based at least in part on an activation event, wherein the activation event comprises at least one of: an environmental condition sensed by another sensor of the vehicle, or a location of the vehicle approaching an obstacle within a distance threshold.

14. The computer-implemented method of claim 12, wherein the test image data corresponds to test image pixels, wherein the baseline image data corresponds to baseline image pixels, and further comprising:

comparing the test image pixels and baseline image pixels based at least in part on pixel attributes;

marking coordinates of the baseline image pixels or the test image pixels based at least in part on an outcome of the comparing, wherein a coordinate is marked as being associated with the contamination or being free of the contamination;

determining a contamination metric based at least in part on a number of coordinates marked as being associated with the contamination and a number of coordinates marked as being free of the contamination; and triggering the corrective action based at least in part on the contamination metric.

15. The computer-implemented method of claim 12, wherein the test image data corresponds to a test image, wherein the baseline image data corresponds to a baseline image, and further comprising:

dividing the test image into test image sections and the baseline image into corresponding baseline image sections;

identifying coordinates of pixels that correspond to a portion of the contamination based at least in part on a comparison of a test image section and a corresponding baseline image section, wherein the comparison of the test image section and the corresponding baseline image section is based at least in part on image histograms or sharpness;

marking the coordinates as being associated with the contamination;

determining a contamination metric based at least in part on the marking; and triggering the corrective action based at least in part on the contamination metric.

16. The computer-implemented method of claim 12, wherein the propulsion operation of the vehicle is controlled based at least in part on sensed data from a plurality of sensors of the vehicle, and wherein the changing the use of the other sensor comprises updating a weight of other sensed data from the other sensor of the vehicle.

17. The computer-implemented method of claim 12, wherein the corrective action further comprises providing a notification about the contamination to an operator device for presentation at a user interface.

18. The computer-implemented method of claim 12, wherein the corrective action further comprises activating at least one of: a wiper, an air blower, or a solution sprayer, wherein the vehicle comprises at least one of: the wiper, the air blower, or the solution sprayer based at least in part on the environment.

19. The system of claim 5, wherein the system is integrated in an unmanned vehicle, and wherein the management module is further configured to initiate the corrective action based at least in part on the contamination.

20. The computer-implemented method of claim 12, further comprising: comparing exposure from ambient light falls and an exposure threshold, wherein the light source is turned on based at least in part on an outcome of the comparing.

* * * * *

UNITED STATES PATENT AND TRADEMARK OFFICE
CERTIFICATE OF CORRECTION

PATENT NO.       : 10,721,375 B1
APPLICATION NO.  : 15/248757
DATED            : July 21, 2020
INVENTOR(S)      : Scott Patrick Boyd et al.

Page 1 of 1

It is certified that error appears in the above-identified patent and that said Letters Patent is hereby corrected as shown below:

In the Claims

Column 24, Line 19, Claim 2:
Delete: "comparing the different to a threshold to detect the con-"
Insert: --comparing the difference to a threshold to detect the con- --

Column 25, Line 19, Claim 7:
Delete: "generate a notification the propulsion system that the"
Insert: --generate a notification to the propulsion system that the--

Column 25, Line 56, Claim 11:
Delete: "turn on the light source based at least in part the known"
Insert: --turn on the light source based at least in part on the known--

Signed and Sealed this
Third Day of November, 2020

Andrei Iancu
*Director of the United States Patent and Trademark Office*